Figure 1:
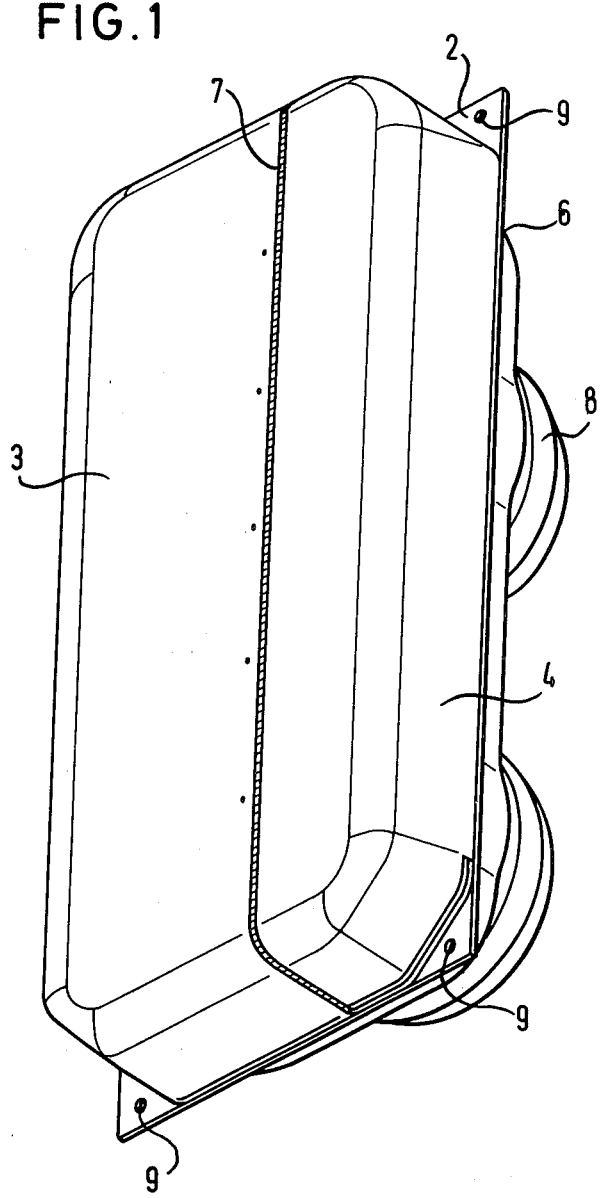

United States Patent [19]
Stütz et al.

[11] 4,400,010
[45] Aug. 23, 1983

[54] AIR BAGS IN MOTOR VEHICLES

[75] Inventors: Michael Stütz, Schwäbisch-Gmünd; Jürgen Mitzkus, Mutlangen, both of Fed. Rep. of Germany

[73] Assignee: REPA Feinstanzwerk GmbH, Alfdorf, Fed. Rep. of Germany

[21] Appl. No.: 247,215

[22] Filed: Mar. 24, 1981

[30] Foreign Application Priority Data

Mar. 25, 1980 [DE] Fed. Rep. of Germany ....... 3011463

[51] Int. Cl.³ .............................................. B60R 21/10
[52] U.S. Cl. .................................... 280/732; 280/739; 280/743
[58] Field of Search ................ 280/732, 739, 743, 728

[56] References Cited

U.S. PATENT DOCUMENTS 3,622,176 11/1971 Byer .................................... 280/732
3,643,971 2/1972 Kushnick ............................ 280/732
3,708,179 1/1979 Hulten ................................. 280/732

*Primary Examiner*—Robert R. Song
*Attorney, Agent, or Firm*—Herbert L. Lerner; Laurence A. Greenberg

[57] ABSTRACT

Device for the storage of air bags in motor vehicles, which are provided for the protection of persons in the vehicle, including a box-shaped housing disposed in a vehicle for receiving a deflected, folded air bag therein being attachable to an inner wall of the vehicle, and filling means disposed in the housing for inflating the air bag with gas during accidents to prevent or reduce injuries, the housing being formed of substantially rigid material and having yieldable walls, a base plate with parallel edges, and a cover having a parting line formed therein parallel to the edges of the base plate defining two cover shells being movably hinged along the edges of the base plate, the cover shells being connected to each other in the vicinity of the parting line by an intentionally breakable point being openable upon a pressure rise in the air bag.

10 Claims, 2 Drawing Figures

AIR BAGS IN MOTOR VEHICLES

The present invention relates to a device used in motor vehicles for the storage of air bags which are provided for the protection of persons in the vehicle, wherein the deflated and folded air bags are fastened to the inner walls of the motor vehicle, are released upon the occurence of an accident, and are rapidly filled with gas and thereby inflated for the prevention or reduction of injuries caused by the impact.

Beside safety belts, air bags which automatically inflate during accidents have proven themselves useful for protection of the persons in the vehicle during accidents. These air bags are normally disposed in front of the persons in the car, and are folded, in the interior of the vehicle. When accidents occur during driving a release mechanism is activated by the impact of the vehicle, and the air bag is inflated rapidly. The persons in the vehicle who are thrown forward by the sudden deceleration of the vehicle, are caught by this inflated air bag, before they hit against hard parts and edges, and especially before they hit the windshield of the vehicle. The inflation of the air bag can be effected in a known manner by a gas bottle or by a gas generator. Air bags which are automatically inflated during accidents have the advantage compared to safety belts that they are not only activated by special actions taken on the part of the persons in the vehicle, i.e. by correctly applying and locking the device. On the contrary, they are ready to function independent of such procedures, and they do not inhibit the freedom of motion of the persons in the car, either in actuality or by giving them the feeling of being restricted.

During the use of such air bags for the prevention of injuries at the occurrance of accidents, an important problem is how to arrange these air bags in the interior of the vehicle. In the stored state they should not unnecessarily reduce and deform the passenger space. On the other hand, the air bags must be disposed in such a way that they are folded out rapidly by the inflowing gas during an accident, in front of the parts which are dangerous, in order to protect the persons in the vehicle.

According to the state of the art, the folded air bags are secured by adhesive strips at the inner walls of the vehicle. The adhesive strips yield and open when the pressure in the air bag increases. However, with this type of fastening the danger exists that the adhesive strips may be unintentionally damaged, become loose or tear. In that case, the air bag hangs loosely downward and is in the way of the passenger to be protected. In the case where this person is the driver, this can even cause an accident. To prevent this from happening great care must be taken to apply these adhesive strips. A further disadvantage of this method of securing the folded air bags is the fact that the air bag material itself lies open and it is not impossible for it to become damaged in the folded state. In the case of an accident such an air bag is not functional, or functions with reduced effectiveness.

It is accordingly an object of the invention to provide a device for the storage of air bags in motor vehicles, which are required for the protection of persons in the vehicle, which overcomes the hereinafore-mentioned disadvantages of the heretofore-known devices of this general type, and which securely stores the folded air bags in their rest position and protects them from damage, and bursts open against a small holding force caused by the rising gas pressure in the air bag during the impact of accidents, so that the air bag can easily infalte to protect the endangered persons in the vehicle.

With the foregoing and other objects in view there is provided, in accordance with the invention, a device for the storage of air bags in motor vehicles, which are provided for the protection of persons in the vehicle, comprising a box-shaped housing disposed in a vehicle for receiving a deflated, folded air bag therein being attachable to an inner wall of the vehicle, and filling means disposed in the housing for inflating the air bag with gas during accidents to prevent or reduce injuries, the housing being formed of substantially rigid material and yet having yieldable walls under the action of forces, a base plate with parallel edges, and a cover having a parting line formed therein parallel to the edges of the base plate defining two cover shells being movably hinged along the edges of the base plate, the cover shells being connected to each other in the vicinity of the parting line by an intentionally breakable point being openable upon a pressure rise, even a small one, in the air bag.

Such a device for storage of air bags serving for the protection of persons in the vehicle, reliably protects the folded air bag, and is itself very resistant with respect to damage. An unintentional reduction of the holding function of this device is very improbable. The reliable release of the air bag in case of an impact-accident is assured by the intentional breaking point which opens when the pressure inside of the air bag rises. Because of the shell-like configuration of the housing, the storage device for the air bag can be advantageously, and with pleasing shape, integrated to the walls of the vehicle. The parts of the housing shell are rigid in their normal state, but are flexible under impact without splintering, so that no additional danger of injuries are caused by these parts, as they open.

In accordance with another feature of the invention, the base plate is rectangular, the parallel edges of the base plate hinged to the shells being the larger edges of the rectangular base plate and being horizontally disposed in the vehicle as upper and lower edges.

In accordance with a further feature of the invention, the cover shells are in the form of a narrower and wider shell, the wider shell overlapping the narrower shell at the parting line, in the region of the edge. This form and proportion of the cover shells is advantageous for the functional behavior during accidents. The more narrow cover part moves upward, and the wider cover part moves downward, around the edges which lie in the direction of the longer dimension of the housing.

In accordance with an added feature of the invention, the narrower shell forms an upper part of the housing and the wider shell forms a lower part of the housing.

In accordance with an additional feature of the invention, the cover shells are connected to each other by a fused seam forming the intentionally breakable point.

In accordance with again another feature of the invention, the cover shells are formed of a thermo-plastic material.

In accordance with again a further feature of the invention, the thermo-plastic synthetic material is polyethylene.

In accordance with again an added feature of the invention, there are provided foil-hinges hingeably attaching the cover shells to the base plate.

The intentional breaking point is arranged between the overlapping cover shells in the region of their edges, so that it is protected from unintentional damage. If the cover shells are made of a thermoplastic synthetic material, especially made of polyethylene, the intentional breaking point can be simultaneously produced by a suitable fusion joint or weld connection between those two overlapping cover shells. The foil-hinges can be cast into the housing parts, or be molded from the thermoplastic material of the housing wall.

In accordance with again an additional feature of the invention, the cover shells are formed of a reinforced foil or sheet material. This foil material reliably protects the air bag and is itself sufficiently rigid, and resistant against damage. It has the advantage that it can be economically manufactured, and can be easily shaped.

In accordance with a concomitant feature of the invention, the base plate has corners and mounting means disposed at the corners, the cover shells having a chamfered shape formed thereon at the corners to make the mounting means accessible.

Other features which are considered as characteristic for the invention are set forth in the appended claims.

Although the invention is illustrated and described herein as embodied in a device for the storage of air bags in motor vehicles, which are provided for the protection of persons in the vehicle, it is nevertheless not intended to be limited to the details shown, since various modifications and structural changes may be made therein without departing from the spirit of the invention and within the scope and range of equivalents of the claims.

Figure 2:
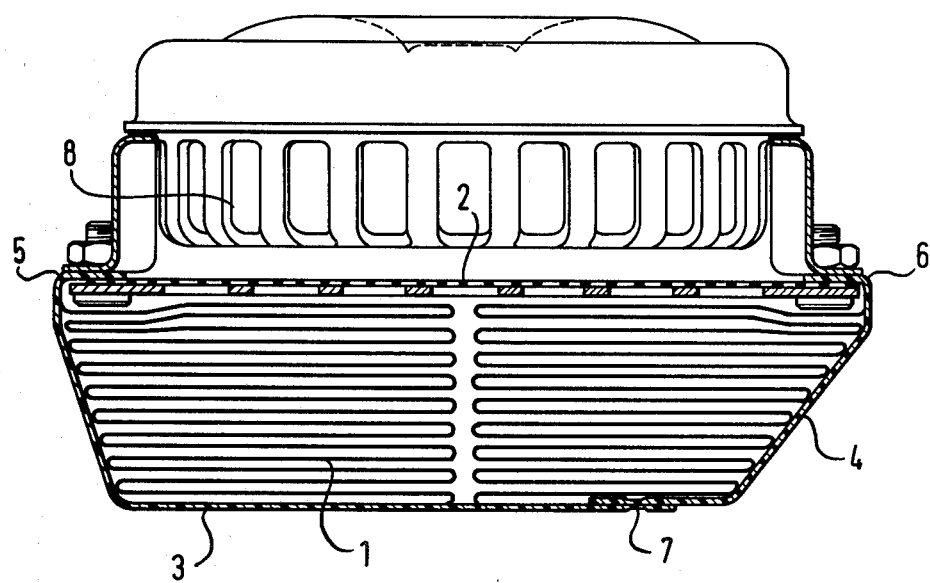

The construction and method of operation of the invention, however, together with additional objects and advantages thereof will be best understood from the following description of specific embodiments when read in connection with the accompanying drawings, in which:

FIG. 1 is a diagrammatic perspective view of the closed holding device for an air bag of the invention; and FIG. 2 is a cross-sectional view seen from the side, through the device of the invention, in the region of the folded air bag.

Referring now particularly to the two figures of the drawing as a whole, it is seen that the holding device for a folded air bag 1 includes a base plate 2 and two cover shells 3,4. These cover shells 3,4 are hinged at the longitudinal edges of the base plate 2 by foil-hinges 5,6. The lengthwise dimension of the holding device, and thus also of the foil hinges 5,6 extends horizontally, with the housing installed in the motor vehicle. The narrower cover shell 4 of the shells 3,4 can fold up or hinge upward, and the wider cover shell 3 can hinge downward. The lower cover shell 3 overlaps the upper cover shell 4 at the parting line in a narrow edge region. Fused or welded connections 7 which hold the two cover shells 3,4 together, serve as an intentional breaking point which opens against a small holding force due to the rising pressure within the air bag 1. The pressure rise is triggered by the impact of an accident, that causes a generator 8 which is attached to a flange at the baseplate of the housing, to supply the air pressure for the air bag. The cover shells 3,4 are ripped open at the intended breaking point 7 and snap apart, while the air bag itself is inflated.

The air bag 1 is fastened to the base plate 2, or vulcanized thereto. The corners of the base plate 2 are provided with mounting holes 9 for fastening the air bag device to the inner walls of the motor vehicle. By giving the cover shells 3,4 a suitable shape in this region, the mounting holes 9 are easily accessible.

The cover shells may be made of a thermo-plastic synthetic material, such as polyethylene, or of reinforced foil or sheet material.

There is claimed:

1. Device for the storage of air bags in motor vehicles, which are provided for the protection of persons in the vehicle, comprising a box-shaped housing disposed in a vehicle for receiving a deflated, folded air bag therein being attachable to an inner wall of the vehicle, and filling means disposed in said housing for inflating the air bag with gas during accidents to prevent or reduce injuries causing the air bag to expand along given horizontal and vertical directions, said housing being formed of substantially rigid material and having yieldable walls, a planar base plate for attachment to the vehicle, said base plate having parallel edges, and a cover having a parting line formed therein parallel to said edges of said base plate defining two cover shells being movably hinged directly along said edges of said base plate and being swingable out of the given horizontal and vertical directions, said cover shells being connected to each other in the vicinity of said parting line by an intentionally breakable point being openable upon a pressure rise in the air bag.

2. Device according to claim 1, wherein said base plate is rectangular, said parallel edges of said base plate hinged to said shells being the larger edges of the rectangular base plate and being horizontally disposed in the vehicle as upper and lower edges.

3. Device according to claim 1, wherein said cover shells are in the form of a narrower and wider shell, said wider shell overlapping said narrower shell at said parting line.

4. Device according to claim 3, wherein said narrower shell forms an upper part of said housing and said wider shell forms a lower part of said housing.

5. Device according to claim 3 or 4, wherein said cover shells are connected to each other by a fused seam forming said intentionally breakable point.

6. Device according to claim 1, wherein said cover shells are formed of a thermo-plastic synthetic material.

7. Device according to claim 6, wherein said thermoplastic synthetic material is polyethylene.

8. Device according to claim 1, including foil-hinges hingeably attaching said cover shells to said base plate.

9. Device according to claim 1, wherein said cover shells are formed of a reinforced foil material.

10. Device according to claim 1, wherein said base plate has corners and mounting means disposed at said corners, said cover shells having a chamfered shape formed thereon at said corners to make said mounting means accessible.

* * * * *